April 17, 1962

W. A. MERCK ETAL 3,029,476

METHOD FOR MAKING BLOWN RUBBER

Filed Dec. 16, 1957

INVENTORS
WILLIAM A. MERCK
MACK W. OLSON
THOMAS J. RHODES
BY
ATTORNEY

April 17, 1962 W. A. MERCK ETAL 3,029,476
METHOD FOR MAKING BLOWN RUBBER
Filed Dec. 16, 1957 3 Sheets-Sheet 3

INVENTORS
WILLIAM A. MERCK
MACK W. OLSON
BY THOMAS J. RHODES

ATTORNEY

United States Patent Office 3,029,476
Patented Apr. 17, 1962

3,029,476
METHOD FOR MAKING BLOWN RUBBER
William A. Merck, Rutherford, Mack W. Olson, Allendale, and Thomas J. Rhodes, Smoke Rise, N.J., assignors to United States Rubber Company, New York, N.Y., a corporation of New Jersey
Filed Dec. 16, 1957, Ser. No. 703,222
7 Claims. (Cl. 18—59)

This invention relates to a method for continuously expanding, shaping, and curing rubber products containing a blowing agent. It further relates to coating said products, if so desired, with an impervious outer layer of a rubber compound containing no blowing agent. Still further, this invention relates to simultaneously reinforcing the said rubber products, if so desired, with a fibrous, relatively inextensible reinforcing material in the interior thereof and intimately bonded thereto.

There is a substantial need in the automotive industry and elsewhere for rubber strips of fairly complex cross sections. These strips are used frequently as weather stripping and for various gasket and sealing functions. Generally, the rubber is required to be either of the sponge variety having interconnected pores or of the cellular variety having non-interconnected pores. For the purposes of this discussion, both of these varieties of blown rubber will be referred to as sponge rubber.

It is frequently found desirable to provide over some or all of the surface of the sponge rubber strip a layer or skin of impervious solid rubber to protect the delicate surface of the expanded rubber. Heretofore this procedure severely complicated any attempt at simultaneously extruding and curing both sponge and impervious layers because the sponge rubber must be allowed to expand after extrusion and before cure.

It is usually considered difficult to intimately incorporate a fibrous, relatively non-extensible reinforcing material, such as a string, within the sponge since, as will be hereafter made clearer, if the sponge and string leave the extrusion head at the same rate of speed, the sponge will increase in speed because of its expansion and there will be continual slippage between sponge and string preventing any intimate bonding. Such a string is very often required in the final product both to give sufficient strength in the final product and to render assistance in the manipulating operations.

It is well known in the art that a blowing agent may be added to a rubber and upon the addition of heat, the said blowing agent will decompose liberating an inert gas in the interior of the rubber and forming the familiar sponge or cellular rubber structure. Various fillers and softeners and the like may be added to the rubber as desired. After the blowing agent is released, the sponge rubber is cured. It is essential that the vulcanization not begin until the blowing reaction has ceased. This is usually accomplished by selecting an accelerator having a slow rate of initial activity or else by selecting an accelarator that will react only at a temperature higher than that at which the blowing agent will decompose.

Typical blowing agents include sodium bicarbonate and diazoaminobenzene although there are many others that are equally satisfactory.

Apparatus for accomplishing the method of our invention comprises, in essence, dual extruders set into a crosshead in which there is a die area positioned on the same axis as a heated curing tube into and through which the extruded material is forced; a means of admitting a suitable lubricant under pressure into the tube; a mandrel of small diameter passing through the crosshead and leading directly into the curing tube and extending a short distance therein which provides a means of feeding a properly treated or prepared string into the tube at a point a short distance beyond the entry of the extruded material, said string adhering to the rubbery material and thereby forming an integral part of the strip or rod, which is guided at the take-off by pinch rollers and suitably wound up or removed.

The exact mode of operation of the invention will be set forth in detail in the following description which is intended to be read with reference to the accompanying drawings wherein.

Figure 2:
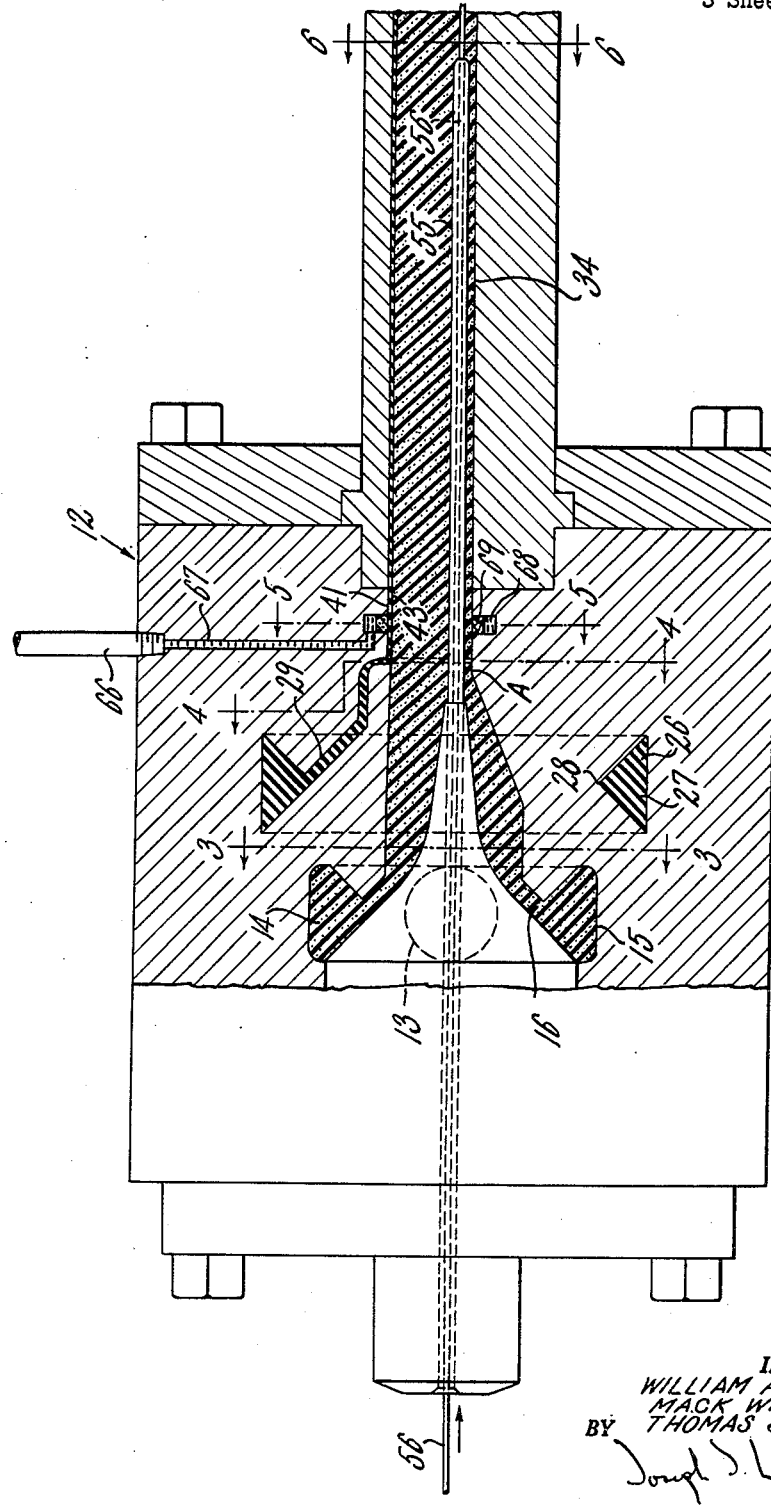
FIG. 2 is a fragmentary elevational view of the apparatus on a larger scale, taken partly in section along the line 2—2 of FIG. 1.
Figure 3:
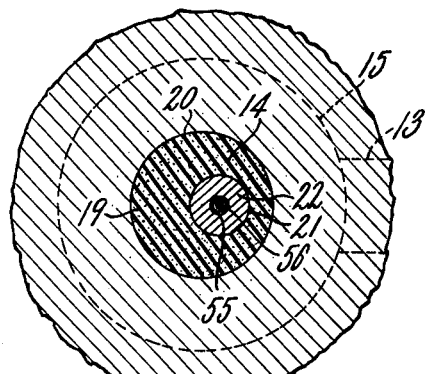
Figure 4:
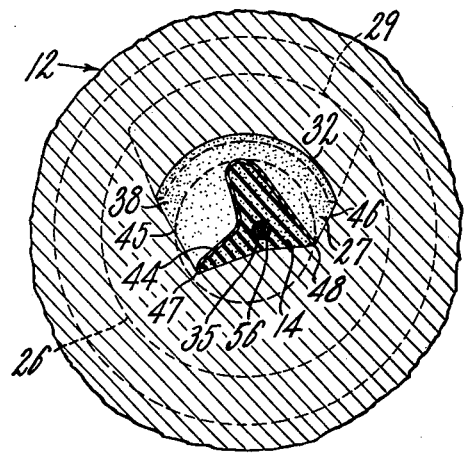
Figure 5:
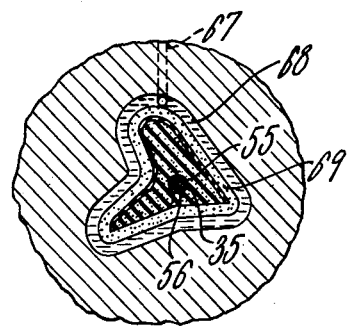
Figure 6:
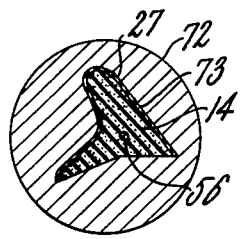
Figure 7:
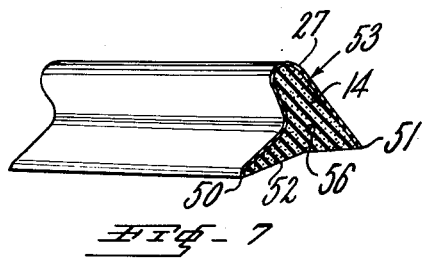

FIGS. 3, 4, 5 and 6 are fragmentary cross-sectional views of the apparatus taken along lines 3—3, 4—4, 5—5 and 6—6 respectively, of FIG. 2; and FIG. 7 is a fragmentary perspective view of the finished product.

The apparatus for accomplishing the method of the invention also includes means for continuously extruding a vulcanizable rubber stock, containing a "blowing agent" capable of liberating gas at elevated temperatures, through a greatly elongated tube having the cross-sectional size and shape of the desired blown strip. The stock fills out such tube entirely and the surface of the stock in contact with the walls of the tube is continuously lubricated to prevent the stock from sticking to such walls. While thus advancing the stock in confinement in the desired shape, heat is applied to decompose the "blowing agent" and thereby produce the desired pores in the rubber, and thereafter to cure or vulcanize the rubber and thereby fix such pores in the rubber mass.

Figure 1:
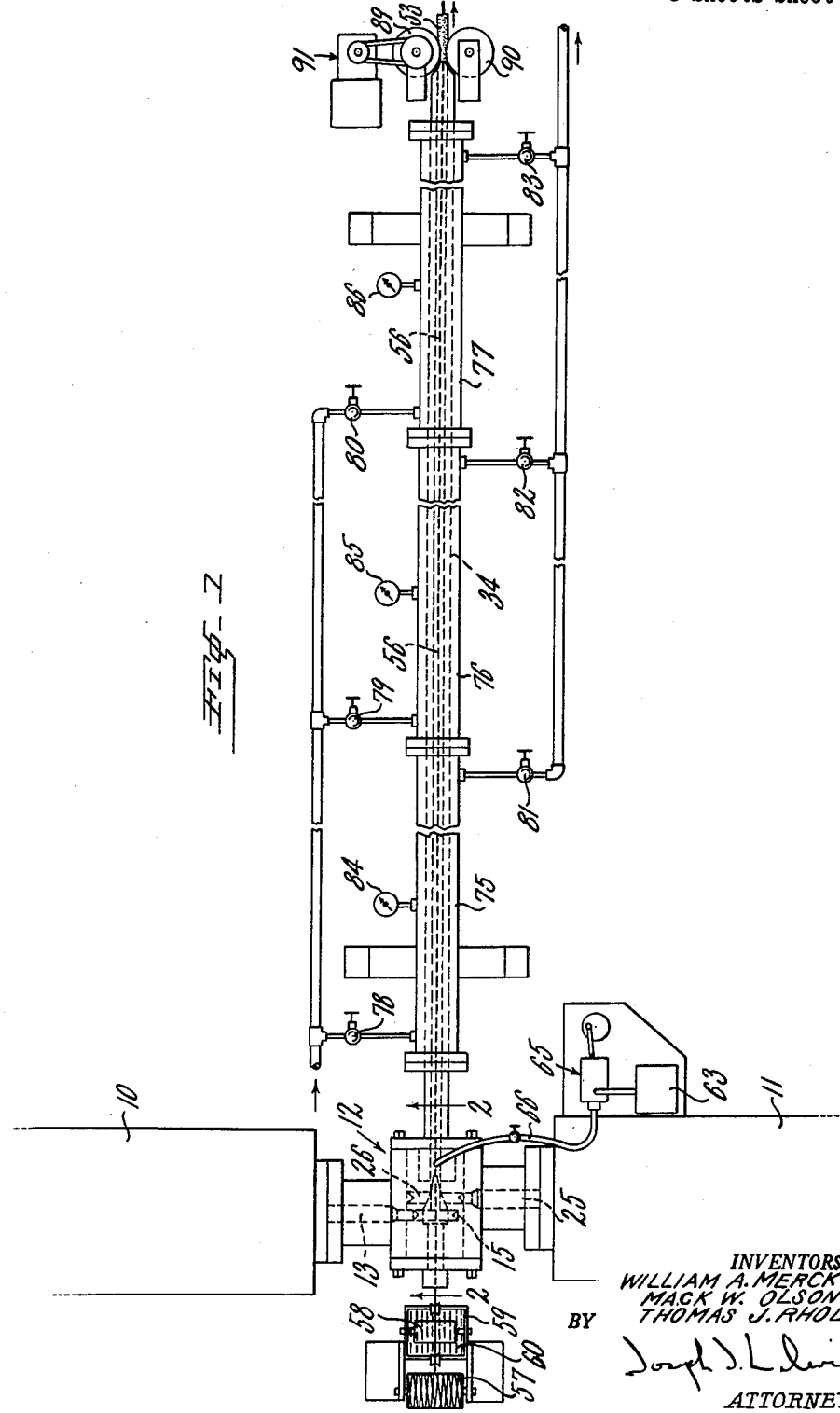
FIG. 1 is a plan view of the apparatus of the invention.

Referring to the drawings, particularly to FIGS. 1 and 2, extrusion crosshead 12 is illustrated. Extruders 10, 11 comprise the dual extruders required in carrying out our invention. The extruders are positioned 90° to each other. They may however be positioned at any angle desired up to opposing feeds positioned at 180° to one another. Extruders 10, 11 feed into extrusion head 12 and are conventional extruders operating in any manner known to the art and serving merely to deliver the stock in a plastic condition through the die and into the curing tube.

First extruder 10 serves to deliver a sponge rubber stock 14 into extrusion passageway 13, through an annular distributing channel or passage 15 of generally triangular cross-sectional shape with an inwardly pointing apex, then through an inwardly extending passage 16 through a die area A of a short length and thence into curing tube 34 abutting die area A. A non-sponge rubber stock 27 is introduced by means of second extruder 11 so positioned as to form a thin sheet of non-sponge rubber on top of the sponge rubber interior. As shown in FIG. 2, stock 27 is introduced through delivery passage 25 (FIG. 1) from extruder 11 into an annular channel 26, which is also triangular in cross-section and has an inwardly pointing apex 28, into the end of the die area A just before the sponge stock 14 enters the curing tube 34. The stock 27 issuing from extruder 11 may be controlled so as to cover only part of the sponge rubber, as for example shown in the finished product illustrated in FIG. 7 wherein the solid rubber skin 27 covers only the upper part of sponge rubber mass 14. This is done by using a segmental channel 29 to connect the annular channel 26 to the die area A in order that the solid rubber may enter at only that portion of the die area A wherein such solid rubber coating is desired.

The sponge rubber stock 14 passing through die area A assumes the shape of the final desired product and this shape is maintained throughout curing tube 34 since the cross-sectional areas of the rubber passageway of the curing tube 34 and die area A are essentially the same.

A central mandrel 55 runs through the extrusion head 12. Within mandrel 55, there is a longitudinal bore designed to accommodate a reinforcing string 56, which is fed into the rear of the extrusion head continuously during the extrusion operation. The string is fed from a rotatably mounted supply reel 57 (FIG. 1), and after leaving the reel the string passes downwardly under a roller 58 immersed in a tank 59 of a lubricating liquid 60 which is thereby applied to the string before it enters the extrusion head. The purpose of lubricating the string will be described in more detail below. The mandrel passes through crosshead 12 and extends into the curing tube for a very short distance.

For the purpose of lubricating the surface of the rubber stock as it passes through the curing tube, there is provided a storage tank 63 (FIG. 1), whence a liquid lubricant is fed by means of a pumping device 65 to a supply line 66 passing into the top of the extrusion head and into communication with an interior radial passageway 67 (FIG. 2) that leads to an annular lubricant-distributing passage 68 located within the head forwardly of the entrance of the solid stock into the die area A or curing tube 34. A ring 69 of porous material, such as porous bronze, or felt, serves to apply lubricant to the passing stock at a slow rate for the purpose of enabling the extruded stock to travel freely through the curing tube 34.

The die area A heretofore referred to is a small length of tubing wherein the extruded sponge stock first assumes the shape required of it in the final product. This die may be of the conventional variety of extrusion dies such as the common steel dies used in most rubber or thermoplastic material extrusions. Abutting this die area A, after provision has been made for the entrance of the impervious rubber coating 27 as hereinbefore described and after provision has been made for lubricant addition, is a long curing tube 34 of essentially the same cross-sectional area as the die area A. It is within the confines of this curing tube 34 that the blowing and curing operations take place.

As is easily apparent, the sponge rubber stock, when the blowing agent decomposes, must of necessity expand. Since by construction of the die and curing tube, there can be no expansion in cross-sectional area, the only possible direction for expansion is in the linear direction. The rates of blowing and curing must be so controlled as to have all blowing cease before curing commences in order to insure uniformity of product and prevent premature curing before termination of the blowing reaction.

There are a number of ways in which this may be achieved. One method is to employ a delayed action type of accelerator in both sponge and impervious rubber stocks. Heat is then applied to the curing tube by means of steam or any other conventional manner. The blowing agent decomposes and the appropriately selected accelerator then becomes active soon thereafter and causes the vulcanization or cure of the stock.

Another method is the one illustrated in FIG. 1 wherein the curing tube 34 is surrounded by three consecutive and independently controlled heating jackets 75, 76, 77 each provided with its own set of inlet valves (78, 79, 80 respectively) and outlet valves (81, 82, 83 respectively) as well as suitable recording devices (84, 85, 86 respectively) to control the flow of steam or other heating media through the jackets thus creating three independent temperature zones within the curing tube. By appropriately choosing blowing agents and accelerator and controlling the zone temperatures, blowing may be initiated in the first zone, carried to completion in the second, followed by vulcanization in the third zone.

The exit end of the curing tube 34 is arcuately tapered on each side so as to bear closely against a pair of interconnected pinch rollers 89, 90 that are driven at a carefully controlled rate of speed by a suitable mechanism 91 in order to stabilize the rate of production which if left alone would tend to vary due to frictional forces between stock and tube wall and due also to some irregularities in the rate of blowing. Upon emerging from the pinch rollers the product 53 may be allowed to drop into a suitable container or may be wound upon a suitable reel (not shown).

In operation, the vulcanizable sponge stock 14 is fed into extruder 10 and extruded into and through die area A where the stock flows around the mandrel 55 and assumes the shape desired of the final product. Immediately beyond the point where the sponge stock achieves the required shape, the solid stock enters at an enlargement of a portion of die area A. Because of the elevated temperature of the two stocks and the positive pressure under which the stocks are confined in the desired shape where they come together the solid skin becomes firmly and integrally united to the sponge rubber. The radial distance between 41 and 43, the enlargement of the die area to accommodate the solid stock, is somewhat greater than the thickness of the final desired solid skin on the finished product because this skin is stretched longitudinally and therefore decreases in thickness, when the linear rate of advancement of the sponge stock increases during blowing.

Shortly after the solid and sponge stocks are thus brought together, the unitary extrusion mass passes across the porous lubricating ring 69, where a thin film of lubricant is applied to the entire outer surface of the rubber by the action of the pump 65. Suitable liquids for this purpose are anti-sticking liquids that are not injurious to the rubber, such as glycerin, soap solutions, certain oils, wetting agents, or compositions containing silicone lubricating bodies. The purpose of the thin film of lubricant is to enable the rubber to pass through the curing tube 34 under positive confining pressure without sticking to the interior walls of the passage.

The sponge stock 14 is compounded of vulcanizable natural or synthetic rubber containing the usual additives including a suitable blowing agent capable of liberating gas at elevated temperatures. The following formulation has proved satisfactory.

| Component: | Parts by weight |
| --- | --- |
| Elastomer | 100 |
| Whiting | 100 |
| Stearic acid | 12 |
| Paraffin oil | 20 |
| Zinc oxide | 5.0 |
| MBTS (di-2-benzothiazyl disulfide) | 1.0 |
| Methazate (zinc dimethyl dithiocarbamate) | 0.25 |
| Beutene (condensation product of butyraldehyde and aniline) | 0.1 |
| Sulfur | 3.0 |
| Unicel S (50% sodium bicarbonate in mineral oil) | [1] 5.0 |

[1] Blowing agent.

The characteristic of such stock is that as elevated temperatures are achieved, the blowing agent decomposes and a gas is generated within the stock, producing voids or pores which may be more or less interconnected depending on the exact conditions of operation, such as rate of extrusion, type of blowing agent, lubricant, and temperature.

When the pores are largely interconnected, the material is in the nature of sponge rubber, whereas when the pores are essentially isolated from each other, the material is essentially non-absorbent, and is properly described as cellular rubber. When the rubber is vulcanized to a form-sustaining state, the pores become permanently fixed therein.

The solid stock 27 is composed of any conventional vulcanizable rubber composition, having essentially the same rate of vulcanization at the same temperature as the sponge stock in order that both stocks may become vulcanized to the required extent as they traverse the length of the apparatus.

Thus, good results are obtained with solid stock 27 and sponge stock 14 having the same composition except for the blowing agent. In the example given, the Unicel S would be absent from stock 27.

In the method of heating illustrated in the accompanying drawings, there are three independently temperature-adjustable zones surrounding curing tube 34. In the first zone 75, the rubber is heated to a temperature high enough to initiate the blowing reaction. In the second heating zone 76 the temperature is slightly lower and the blowing reaction is allowed to go to completion. The sponge rubber stock must of course increase greatly in volume as it blows or expands. Since the only direction in which the rubber can expand in the curing tube 34 is in the linear direction, the expansion manifests itself in an increase in linear speed of the rubber in the zones of the curing tube where the blowing takes place. In the third heating zone 77 the temperature is maintained sufficiently high to vulcanize the stock, thus setting the pores before the rubber is released from confinement. Where the materials used for the sponge stock 14 and solid stock 27 were composed of the ingredients as listed in the example heretofore given, it was found that suitable results were obtained with temperature settings of about 275° F. in the first zone 75, about 250° F. in the second zone 76 and from about 325° to about 375° F. in the third zone 77. It will be apparent that the rubber product 53 leaves the apparatus at a greater linear speed than the linear speed of the rubber in the first part of the tube, near the extrusion head. The rate of emergence of the rubber from the confining tube is carefully stabilized by rotating the pinch rollers 89, 90 at a regulated speed as hereinafter described.

The reinforcing string 56 is drawn through the apparatus by the movement of the rubber at a rate equal to the maximum linear speed of the rubber, that is, the speed of the rubber toward the exit end of the apparatus. Since the string is comparatively inextensible it must of course move at essentially the same linear speed throughout its length. The linear speed of the string is therefore greater than the linear speed of the rubber stock in the initial section of the curing tube. To provide for this relative movement of the string and the rubber, the string is pulled through the tank 59 of lubricating liquid 60 after leaving its supply reel 57 and before entering the extrusion head. The thus-lubricated string is drawn through the mandrel 55 and is introduced into the rubber stock in the initial part of the curing tube 34. Because of the presence of the lubricant the string readily slides with respect to the rubber in the first section of the tube. Lubricants suitable for this purpose are materials that are not injurious to the rubber stock.

To enable the string to perform the desirable reinforcing function in the final product, the rubber stock must be securely bonded to the string. This requirement appears contradictory to the aforestated requirement of lubrication of the string to permit relative movement of the string and the rubber. However, we have found that these requirements can be remarkably achieved by employing as the lubricant an adhesive composition which is initially, under the conditions existing in the forepart of the curing tube, in a relatively fluid state, but in the final product is in a solid condition and serves to bond the string to the rubber. Preferable lubricants are materials that are initially of a fluid nature, but set or solidify at rubber vulcanizing temperature to form a strong bond between the rubber and the string. Thermosetting resins, such as phenolic resin compositions, fulfill this requirement, as do polyvinyl chloride plastisols.

If no irregularities occurred in the progress of the stock due to variations in the blowing agent, lubricant, heat, or to other causes, it is doubtful that either pinch rollers or capstan to stabilize the rate of feed of the string would be necessary. But, because such irregularities are generally unavoidable due to inherent imperfections in mechanical devices, stabilizing both the rate of finished stock emerging from the machine and the intake of string insures a better product.

The pair of pinch rollers, 89, 90, above mentioned, both of which are driven and controlled by a variable speed drive, stabilize the rate of output very well. When the stock tends to move too fast, the pinch rollers hold it back, or when the tendency is for it to go too slowly, they pull it out at a uniform rate, thereby controlling cure, cellular structure, and density.

The pinch rollers and capstan for string feed may be independently regulated or they may be synchronized and regulated by a common control which would simultaneously alter the speed of both. In operation, one might set the speed at the lowest blow ratio expected and gradually make such adjustments as appear wise in the course of operation. Finer subsequent adjustments may easily be made.

A second capstan may be placed after the pinch rollers and synchronized with them to provide greater surface contact with the emerging stock and thereby assist the pinch rollers. Such assistance may be needed when stock of unusually irregular cross-section is being made since such stock meets greater resistance from the walls of the tube. Such capstan is also useful as an intermediate device between the pinch rollers and a spool upon which the strip or rod is wound. The capstan may replace the pinch rollers entirely for certain operations.

While our invention has been described in terms of a specific embodiment and a specific composition of rubber stock, it is to be understood that such description is for purposes of convenience of presentation and is not to be construed as a limitation of the scope hereof. It will be easily apparent that changes may be made without departing from the spirit of our invention which is to be limited only by the claims appended hereto.

Having thus described our invention, what we claim and desire to protect by Letters Patent is:

1. A method of continuously producing blown rubber products covered at least in part by a thin sheet of non-blown rubber comprising in combination the steps of preparing two rubber stocks, a first of said rubber stocks containing a chemical blowing agent capable of decomposing to liberate gas at elevated temperatures and containing an accelerator, said stocks being so compounded and said temperatures being so selected that blowing of said first stock occurs and thereafter vulcanization of said stocks occurs while said stocks are at said elevated temperatures, continuously extruding said first stock containing said blowing agent through a die and continuously and concurrently extruding the other stock over at least part of the periphery of said first stock and then continuously subjecting both stocks while confined in an elongated tube having the final cross-sectional shape of the product to heat to cause blowing of said first stock in a linear direction and thereafter to cause vulcanization of both stocks while continuously maintaining a uniform rate of emergence of said stocks from said elongated tube in order to stabilize the degree of blowing of the first stock and to maintain the stocks under a definite pressure during blowing and vulcanization.

2. A method as in claim 1 wherein a reinforcing string is incorporated into the sponge stock by passing the string through the initial section of the curing tube at a greater linear speed than the linear speed of the stock at said initial section to compensate for the increase in the linear speed of the stock in later sections of the curing tube when blowing occurs.

3. A method of continuously producing blown rubber products having incorporated therein and intimately bonded thereto a reinforcing string comprising in combination the steps of preparing a sponge rubber stock containing a chemical blowing agent capable of decomposing to liberate gas at elevated temperatures and containing an accelerator, said stocks being so compounded and said temperatures being so selected that blowing of said first stock occurs and thereafter vulcanization of said stocks occurs while said stocks are at said elevated temperatures, extruding said sponge stock through a die having the cross-sectional shape desired of the final product and then passing said sponge stock through an elongated curing tube containing a passageway having the cross-sectional shape desired of the final product, passing a fibrous relatively inextensible reinforcing string through said die and through the initial section of said curing tube at a greater linear speed than the linear speed of said stock through said initial section, heating the curing tube to cause blowing in a linear direction and thereafter to cause vulcanization to occur and stabilizing the rate of emergence of the thus blown and vulcanized stocks from said curing tube to stabilize the degree of blowing of the first stock and to maintain the stocks under a definite pressure within the curing tube.

4. A method as in claim 2 wherein said reinforcing string is coated with a lubricant that is liquid until it is subjected to the vulcanization temperature of rubber at which temperature said lubricant irreversibly solidifies, thereby serving as an adhesive between said reinforcing string and the layer of blown rubber around said string.

5. A method as in claim 2 wherein said reinforcing string is coated with a lubricant.

6. A method as in claim 3 wherein the reinforcing string is coated with a lubricant.

7. A method as in claim 3 wherein said reinforcing string is coated with a lubricant which lubricant becomes a bonding agent after the rubber has been expanded by blowing.

References Cited in the file of this patent

UNITED STATES PATENTS

| | | |
|---|---|---|
| 2,537,977 | Dulmage | Jan. 16, 1951 |
| 2,538,406 | Allen | Jan. 16, 1951 |
| 2,581,769 | Olson | Jan. 8, 1952 |
| 2,683,285 | Ramsey | July 13, 1954 |
| 2,747,224 | Koch et al. | May 29, 1956 |
| 2,770,841 | Cooke et al. | Nov. 20, 1956 |
| 2,817,875 | Harris et al. | Dec. 31, 1957 |

FOREIGN PATENTS

| | | |
|---|---|---|
| 423,496 | Great Britain | Feb. 1, 1935 |
| 520,560 | Great Britain | Apr. 26, 1940 |

UNITED STATES PATENT OFFICE
CERTIFICATE OF CORRECTION

Patent No. 3,029,476　　　　　　　　　　　　　April 17, 1962

William A. Merck et al.

It is hereby certified that error appears in the above numbered patent requiring correction and that the said Letters Patent should read as corrected below.

In the grant, line 1, and in the heading to the printed specification, line 3, for "Mack W. Olson", each occurrence, read -- Mark W. Olson --.

Signed and sealed this 7th day of August 1962.

(SEAL)
Attest:

ERNEST W. SWIDER
Attesting Officer

DAVID L. LADD
Commissioner of Patents